United States Patent [19]

Tanaka

[11] Patent Number: 4,807,042
[45] Date of Patent: Feb. 21, 1989

[54] METHOD OF IMAGE SIGNAL ENCODING BY ORTHOGONAL TRANSFORMATION

[75] Inventor: Nobuyuki Tanaka, Kanagawa, Japan

[73] Assignee: Fuji Photo Film Co., Ltd., Kanagawa, Japan

[21] Appl. No.: 6,844

[22] Filed: Jan. 27, 1987

[30] Foreign Application Priority Data

Jan. 27, 1986 [JP] Japan .................................. 61-15264

[51] Int. Cl.$^4$ ......................................... H04N 1/419
[52] U.S. Cl. ..................................... 358/260; 364/725
[58] Field of Search ............... 358/261; 340/247 DD; 364/725, 726, 727

[56] References Cited

U.S. PATENT DOCUMENTS 4,698,689 10/1987 Tzou .................................... 358/725
4,731,860 3/1988 Wahl .................................... 358/725

Primary Examiner—Edward L. Coles, Sr.
Attorney, Agent, or Firm—Sughrue, Mion, Zinn, Macpeak & Seas

[57] ABSTRACT

A method of image signal encoding by orthogonal transformation comprises the steps of obtaining transformed signals by conducting orthogonal transformation on two-dimensional image signals based on a predetermined orthogonal function, and encoding each of the transformed signals with an intrinsic allocated code length. The transformed signal is encoded with a code length obtained by adding an extension code length to the allocated code length when the transformed signal attains a value not smaller than the maximum value within the range encodeable with the allocated code length or a value not larger than the minimum value within the encodeable range.

2 Claims, 3 Drawing Sheets

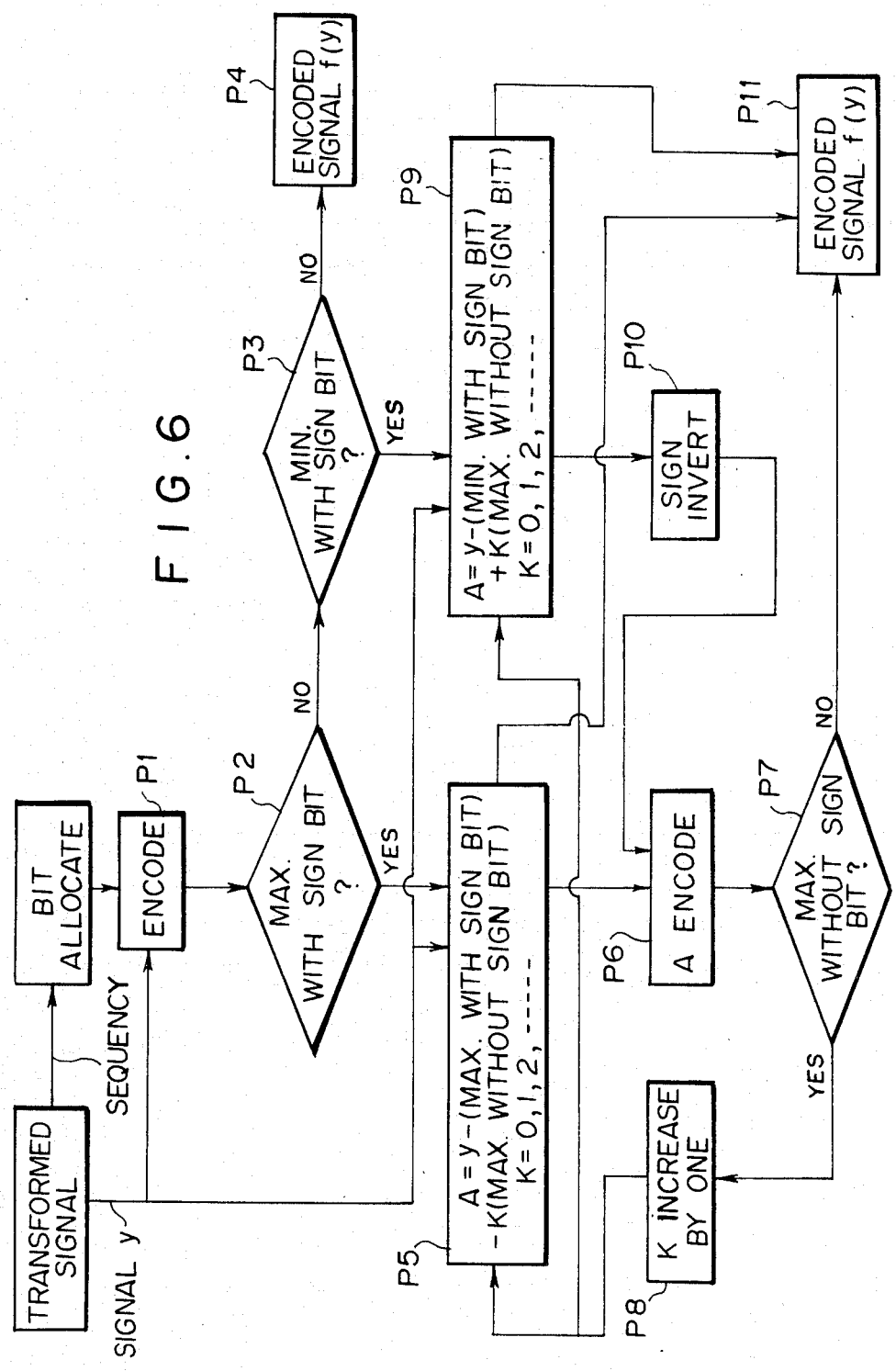

METHOD OF IMAGE SIGNAL ENCODING BY ORTHOGONAL TRANSFORMATION

BACKGROUND OF THE INVENTION

1. Field of the Invention

This invention relates to a method of encoding image signals for the purpose of signal compression. This invention particularly relates to a method of encoding image signals by orthogonal transformation.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

As one of the methods of image signal compression, a method utilizing orthogonal transformation of image signals is well known. In this method, digital two-dimensional image signals are divided into blocks comprising an appropriate number of samples, and orthogonal transformation of a value string comprising the sample values is conducted for each block. Since energy is concentrated at a specific component by the orthogonal transformation, a component of high energy level is encoded (quantized) by allocating a long code length thereto, and a component of low energy level is encoded coarsely with a short code length, thereby reducing the number of codes per block. As the orthogonal transformation, Fourier transformation, cosine transformation, Hadamard transformation, Karhunen-Loève transformation, or Harr transformation is usually used. The aforesaid image signal compression method will hereinbelow be described in further detail by taking the Hadamard transformation as an example. As shown in FIG. 2, blocks are formed by dividing digital two-dimensional image signals in a unit of, for example, two signals in a predetermined one-dimensional direction. When sample values $x(0)$ and $x(1)$ in the block are plotted on an orthogonal coordinate system, since correlation therebetween is high as mentioned above, most of the sample values are distributed near the straight line represented by the formula $x(1)=x(0)$ as shown in FIG. 3. Therefore, as shown in FIG. 3, the orthogonal coordinate system is transformed by an angle of 45° to determine a new $y(0)-y(1)$ coordinate system. On the $y(0)-y(1)$ coordinate system, $y(0)$ represents the low frequency component of the original image signals prior to transformation, and attains a value slightly larger than $x(0)$ and $x(1)$ [a value approximately $t\sqrt{2}$ times the values of $x(0)$ and $x(1)$]. On the other hand, values of $y(1)$ representing the high frequency component of the original image signals are distributed just within a very narrow range near the $y(0)$ axis. In the case where a code length of, for example, seven bits is required for encoding of $x(0)$ and $x(1)$, seven bits or eight bits are required for encoding of $y(0)$. On the other hand, $y(1)$ can be encoded with a code length of, for example, four bits. Consequently, the code length per block is shortened, and compression of the image signals is achieved.

Orthogonal transformation of second order wherein each block is constituted by two image signals is conducted as mentioned above. As the order is increased, the tendency of energy concentrating at a specific component is increased, and it becomes possible to improve the effect of decreasing the number of bits. In general, the aforesaid transformation can be conducted by use of an orthogonal function matrix. In an extreme case, when an intrinsic function of the objective image is selected as the orthogonal function matrix, the transformed image signals are constituted by the intrinsic value matrix, and the original image can be expressed just by the diagonal component of the matrix. Also, instead of dividing the image signals just in a single direction to form blocks as mentioned above, each block may be constituted by two-dimensional image signals. In this case, the effect of decreasing the number of bits is markedly improved over the one-dimensional orthogonal transformation.

The transformed signals obtained by the aforesaid two-dimensional orthogonal transformation are arranged in the order of the sequency (i.e. the number of "0" position crossing) of the orthogonal function utilized for the transformation in each block. Since the sequency is correlated with the spatial frequency, the transformed signals are put side by side in the longitudinal and transverse directions in the order of the frequency as shown in FIG. 4. Therefore, the code length per block may be shortened by allocating a comparatively long code length to the transformed signals representing the low frequency component (i.e. the signals on the left upper side in FIG. 4) as in the case where a longer code length is allocated to $y(0)$ in the aforesaid one-dimensional orthogonal transformation of second order, and allocating a comparatively short code length or no code to the transformed signals representing the high frequency component (i.e. the signals on the right lower side in FIG. 4).

The aforesaid allocation of the code lengths is conducted in accordance with a predetermined pattern. However, since the code length necessary for representing the transformed signals of a sequency differs with images and blocks, it may occur that the predetermined and allocated code length is insufficient to represent the transformed signal accurately. In such a case, the maximum value or the minimum value which can be represented with the allocated code length is taken as the encoded signal. As a result, the image quality of a reproduced image obtained by decoding and inverse transformation is deteriorated. In order to eliminate this problem, the allocated code length determined in advance may be adjusted to a substantially long value. However, with this method, it is impossible to compress the image signals substantially.

SUMMARY OF THE INVENTION

The primary object of the present invention is to provide a method of image signal encoding by orthogonal transformation wherein the signal compression ratio is increased substantially.

Another object of the present invention is to provide a method of image signal encoding by orthogonal transformation, which is free from deterioration in image quality of a reproduced image caused by insufficiency of code length.

The present invention provides a method of image signal encoding by orthogonal transformation wherein transformed signals are obtained by conducting orthogonal transformation on two-dimensional image signals based on a predetermined orthogonal function, and each of the transformed signals is encoded with an intrinsic allocated code length, wherein the improvement comprises the step of: encoding the transformed signal with a code length obtained by adding an extension code length to said allocated code length when said transformed signal attains a value not smaller than the maximum value within the range encodeable with said allocated code length or a value not larger than the minimum value within said encodeable range.

With the method of image signal encoding by orthogonal transformation in accordance with the present invention, since the code length is extended when the signal obtained by orthogonal transformation cannot be accurately encoded with the allocated code length, it is possible to accurately encode all of the signals obtained by the orthogonal transformation, and therefore to prevent the image quality of a reproduced image, which is obtained by decoding and inverse transformation, from becoming inferior to the image quality of the original image. Also, since extension of the code length is effected as mentioned above, it is possible to adjust the predetermined, allocated code length to a substantially small value without considering prevention of clipping of transformed signals. Therefore, it becomes possible to substantially improve the data compression ratio.

BRIEF DESCRIPTION OF THE DRAWINGS

FIG. 6 is a flow chart showing the flow of encoding processing of signals obtained by orthogonal transformation in the apparatus shown in FIG. 1.

DESCRIPTION OF THE PREFERRED EMBODIMENTS

The present invention will hereinbelow be described in further detail with reference to the accompanying drawings.

Figure 1:
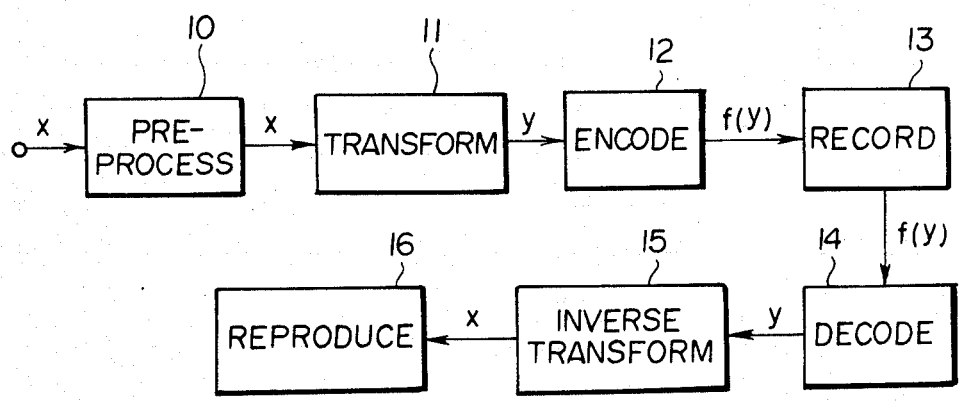
FIG. 1 is a block diagram showing the configuration of an apparatus for carrying out an embodiment of the method of image signal encoding by orthogonal transformation in accordance with the present invention.
Figure 2:
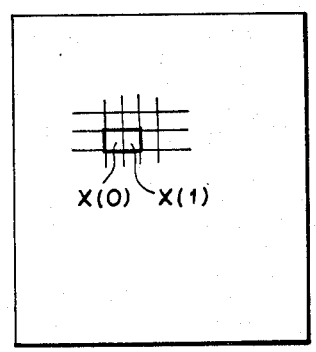
FIGS. 2 and 3 are explanatory views showing the orthogonal transformation in accordance with the present invention.
Figure 3:
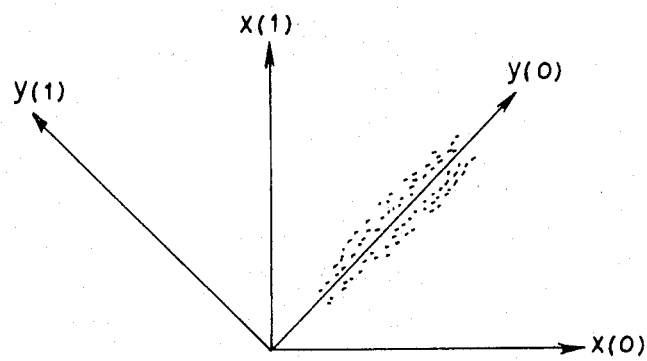
Figure 5:
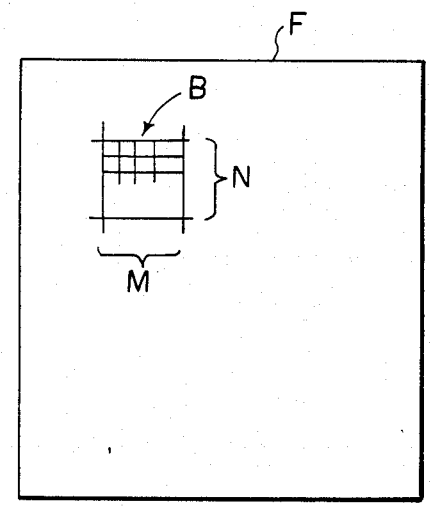

Referring to FIG. 1, which schematically shows an apparatus for carrying out an embodiment of the method of image signal encoding by orthogonal transformation in accordance with the present invention, image signals (original image signals) x representing a half tone image are first sent to a pre-processing circuit 10 and subjected therein to preprocessing for improvement of the data compression efficiency, for example, smoothing for noise removal. The pre-processed image signals x are sent to an orthogonal transformation circuit 11 and subjected therein to two-dimensional orthogonal transformation. For example, as shown in FIG. 5, the two-dimensional orthogonal transformation is conducted in a unit of a rectangular block B comprising M×N number of samples (picture elements) in a half tone image represented by the image signals x. As the orthogonal transformation, the Hadamard transformation may be used. Since the transformation matrix in the Hadamard transformation is constituted just by $+1$ and $-1$, the Hadamard transformation can be executed by use of a transformation circuit simpler than in the other orthogonal transformations. Also, as well known, two-dimensional orthogonal transformation can be reduced to one-dimensional orthogonal transformation. Specifically, the two-dimensional orthogonal transformation is carried out by subjecting the image signals at the M×N number of picture elements in the two-dimensional block B to one-dimensional orthogonal transformation in the longitudinal direction, and then subjecting the M×N number of transformed signals thus obtained to one-dimensional orthogonal transformation in the transverse direction. The transformation in the longitudinal direction and the transformation in the transverse direction may be conducted in the reverse order.

Figure 4:
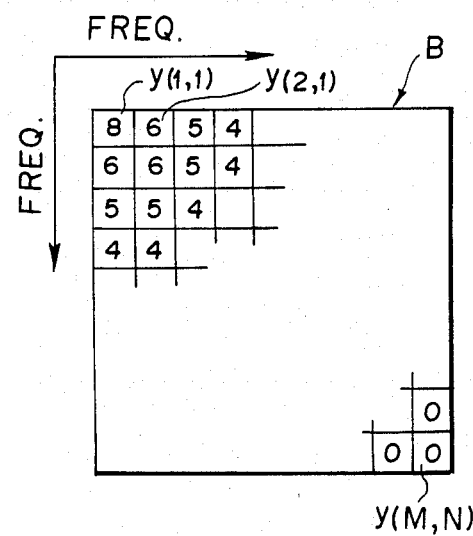
FIGS. 4 and 5 are explanatory views showing the method of image signal encoding by orthogonal transformation in accordance with the present invention.

As shown in FIG. 4, transformed signals obtained by the two-dimensional orthogonal transformation are put side by side in each block in the longitudinal and transverse directions in the order of the sequency of the function on which the orthogonal transformation is based (for example, the Walsh function in the case of the Hadamard transformation, or the trigonometrical function in the case of the Fourier transformation). Since the sequency corresponds to the spatial frequency, the transformed signals y are arranged in the order of the spatial frequency, i.e. in the order of the density of the detail components of the image, in the longitudinal and transverse directions in the block B. In FIG. 4, a transformed signal $y(1,1)$ at the left end column on the top line corresponds to sequency 0 (zero). As well known, the transformed signal $y(1,1)$ represents the average image density in the block B.

The transformed signals y thus arranged are sent to an encoding circuit 12 and encoded thereby. Encoding of the transformed signals y conducted by the encoding circuit 12 will hereinbelow be described with reference to FIG. 6. The encoding circuit 12 stores a predetermined bit allocation table and encodes each of the transformed signals y in the block B with a code length (i.e. a number of bits) in accordance with the allocation table [step P1]. In the case of null bit allocation, the transformed signal y is discarded. In the bit allocation table, an intrinsic number of bits is allocated for each sequency. Since energy is concentrated at the low frequency component in the transformed signals y as mentioned above, it is possible to decrease the number of bits required per block B and to achieve image signal compression by allocating a comparatively long code length to the low frequency component with high energy, and allocating a comparatively short code length to the high frequency component with low energy, or discarding the high frequency component in some cases. However, as mentioned above, it may occur that the transformed signal y is of a value too large to be expressed with the allocated number of bits, or of a very small value. In such a case, the transformed signal y is encoded as the maximum value or the minimum value which can be expressed with the allocated number of bits (however, the case of null bit allocation is excluded). Therefore, the encoding circuit 12 thereafter discriminates whether the encoded signal represents the maximum value or the minimum value [steps P2 and P3]. In the case where the encoded signal represents neither the maximum value nor the minimum value, since the transformed signal y has been encoded correctly with the allocated number of bits, the transformed signal y is output directly as an encoded signal $f(y)$ [step P4].

The aforesaid encoding will now be described in more detail. For example, allocation of four bits to the transformed signal y of a sequency is determined in the allocation table. Also as shown in the table below, transformed signals y of 16 values within the range of from the minimum value of −8 to the maximum value of +7 are encoded with four-bit binary numerals with a sign bit.

| Transformed signal | Encoded signal | Transformed signal | Encoded signal |
|---|---|---|---|
| −8 | 1000 | 0 | 0000 |
| −7 | 1001 | 1 | 0001 |
| −6 | 1010 | 2 | 0010 |
| −5 | 1011 | 3 | 0011 |
| −4 | 1100 | 4 | 0100 |
| −3 | 1101 | 5 | 0101 |
| −2 | 1110 | 6 | 0110 |
| −1 | 1111 | 7 | 0111 |

In this case, the encoding circuit 12 discriminates whether the encoded signal is "0111" or not in the step P2, and discriminates whether the encoded signal is "1000" or not in the step P3. When the value of the transformed signal y is within the range of from −7 to 6, since the encoded signal is not "0111" nor "1000", the signal is directly output as the encoded signal f(y) of the transformed signal y in the step P4.

However, when the value of the transformed signal y is not smaller than 7, since the encoded signal becomes "0111", the value of k in the step P5 shown in FIG. 6 is adjusted to 0 (zero), and subtraction expressed as $$A = (\text{transformed signal } y) - (\text{maximum value with sign bit: 7}) - 0 \times (\text{maximum value without sign bit: 15})$$

is conducted. In a step P6, the value A within the range of from 0 to 15 is then encoded to a four-bit binary numeral without the sign bit as shown in the table below.

| Transformed signal | Encoded signal |
|---|---|
| 0 | 0000 |
| 1 | 0001 |
| . | . |
| . | . |
| . | . |
| 14 | 1110 |
| 15 | 1111 |

Specifically, when the value of the transformed signal y is 10 for example, 3 (=10−7) is encoded into "0011" in the step P6. In the next step P7, the encoded signal is discriminated in the same manner as in the step P2. In the case of this example, since the value of A is 3, the encoded signal "0011" representing 3 is sent to a step P11. Also, the step P11 is informed of completion of the processing in the step P5. Based on this information, in the step P11, the processing for adding the encoding signal "0011", which is sent from the step P7, as an extension signal to the four-bit signal "0111" representing the maximum value of 7 is carried out. Consequently, an eight-bit signal "01110011" is output as the encoded signal f(y). In the case where the four-bit signal encoded in the step P6 attains the value "1111", i.e. when the value of the transformed signal y is not smaller than 22, the value of k in the step P is increased by one. Thus in the step P5, the value of k is adjusted to 1, and subtraction expressed as $$A = (\text{transformed signal } y) - (\text{maximum value with sign bit}) - 1 \times (\text{maximum value without sign bit})$$

is conducted. The value A is encoded in the step P6 in the same manner as mentioned above. Also, the step P11 is informed of the fact that the processing of the step P5 has again been conducted. Based on the information, in the step P11, the four-bit signal "1111" representing the maximum value without the sign bit is added as an extension signal to the four-bit signal "0111" representing the maximum value with the sign bit. Further, the encoded signal obtained in the step P6 is added as an extension signal, and the encoded signal f(y) is formed.

In the case where the encoded data is discriminated to be "1000" in the step P3, i.e. when the value of the transformed signal y is not larger than −8, the minimum value of −8 which the four-bit encoded signal with the sign bit can represent is subtracted from the value of the transformed signal y in a step P9. The value thus obtained is then subjected to positive-negative sign inversion processing in a step P10, sent to the step P6, and processed in the same manner as mentioned above. In this case, when the value of the transformed signal y is −10 for example, 2 is encoded into a four-bit signal "0010" in the step P6, and the four-bit signal "0010" is coupled as an extension signal with the four5 bit signal "1000" representing −8. Since the signal "1000" based on the basic allocated bits is of the value representing "−" (minus), the coupled signal "10000010" represents −(8+2), i.e. −10.

The image signals f(y) encoded in the aforesaid manner are recorded on a recording medium (image file) such as an optical disk, or a magnetic disk in a recording and reproducing apparatus 13. Since the image signals f(y) has been marked compressed as compared with the original image signals x, a large number of images can be recorded on a recording medium such as an optical disk. When the image is to be reproduced, the image signals f(y) are read out from the recording medium, and decoded into the transformed signals y in a decoding circuit 14. The transformed signals y thus decoded are sent to an inverse transformation circuit 15 and transformed inversely to the aforesaid two-dimensional orthogonal transformation. The original image signals x are thus restored, and sent to an image reproducing apparatus for use in reproduction of the image which the image signals x represent.

Though the case wherein the allocated code length is four bits is taken as an example, the extension code length may be given in the same manner to transformed signals also in the case where the allocated code length is other than four bits. Also, though the extension code length is adjusted to the same length as the allocated code length or to a length larger than the allocated code length in the aforesaid embodiment, the extension code length may be adjusted to be shorter than the allocated code length.

Also, though extension of the code length is conducted many times until the transformed signals y are not clipped any more as the maximum value or the minimum value in the aforesaid embodiment, the extension of the code length may be limited to one extension for example, and the extension code length may be defined as a single length.

I claim:

1. A method of image signal encoding by orthogonal transformation wherein transformed signals are obtained by conducting orthogonal transformation on two-dimensional image signals based on a predetermined orthogonal function, and each of the transformed signals is encoded with an intrinsic allocated code length selected to have a value sufficient to encode a transformed signal within a range between a maximum and a minimum value, wherein the improvement comprises the step of: encoding the transformed signal with a code length obtained by adding an extension code length to said allocated code length when said transformed signal attains a value not smaller than the maximum value within the range encodeable with said allocated code length or a value not larger than the minimum value within said encodeable range.

2. A method as defined in claim 1 wherein said extension code length is adjusted to the same length as said allocated code length and said allocated code length combined with said extension code length form an extended allocated code length whose value is sufficient to encode a transformed signal within a new range between a new maximum and a new minimum value, and encoding is conducted by further adding extension code lengths sequentially when said transformed signal in not smaller than the new maximum value within the new range encodeable with the code length obtained by adding the extension code length to the allocated code length, or when said transformed signal is not larger than the new minimum value within said encodeable range.

* * * * *